United States Patent
Lim et al.

(10) Patent No.: US 10,485,033 B2
(45) Date of Patent: Nov. 19, 2019

(54) METHOD AND DEVICE FOR DETECTING SMALL DATA FROM MOBILE COMMUNICATION SYSTEM

(71) Applicant: Samsung Electronics Co., Ltd., Suwon-si, Gyeonggi-do (KR)

(72) Inventors: Han Na Lim, Seoul (KR); Song Yean Cho, Seoul (KR); Sang Soo Jeong, Suwon-si (KR); Beom Sik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 14/424,262

(22) PCT Filed: Sep. 17, 2013

(86) PCT No.: PCT/KR2013/008412
§ 371 (c)(1),
(2) Date: Feb. 26, 2015

(87) PCT Pub. No.: WO2014/046464
PCT Pub. Date: Mar. 27, 2014

(65) Prior Publication Data
US 2015/0245390 A1     Aug. 27, 2015

(30) Foreign Application Priority Data

Sep. 20, 2012 (KR) .................. 10-2012-0104773
Oct. 2, 2012 (KR) .................. 10-2012-0109685

(51) Int. Cl.
*H04W 52/02* (2009.01)
*H04W 76/11* (2018.01)
(Continued)

(52) U.S. Cl.
CPC ............ *H04W 76/11* (2018.02); *H04L 45/026* (2013.01); *H04L 69/167* (2013.01); *H04W 72/0406* (2013.01)

(58) Field of Classification Search
CPC ..... H04W 28/04; H04W 28/06; H04W 72/04; H04W 72/042; H04W 72/0406;
(Continued)

(56) References Cited

U.S. PATENT DOCUMENTS 8,954,045 B2   2/2015   Chhabra et al.
9,402,176 B2   7/2016   Wang
(Continued)

FOREIGN PATENT DOCUMENTS

CN   101517539 A   8/2009
CN   102215605 A   10/2011
(Continued)

OTHER PUBLICATIONS

"3rd Generation Partnership Project; Technical Specification Group Services and System Aspects; System Improvements for Machine-Type Communications (MTC) (Release 11)" Valbonne ; France Sep. 18, 2012.

*Primary Examiner* — Redentor Pasia
*Assistant Examiner* — Rasha K Fayed
(74) *Attorney, Agent, or Firm* — Jefferson IP Law, LLP

(57) ABSTRACT

Provided are a method and device that identify characteristics of data to be sent by a user equipment and send small-sized data via a control message. The data transmission method for the user equipment may include: generating IP data; determining whether the IP data corresponds to small data that has a size less than or equal to a preset reference size or matches identification information of a preset service; and transmitting the IP data through a connection management (CM) layer to the network by use of a control message.

16 Claims, 6 Drawing Sheets

(51) Int. Cl.
*H04L 12/751* (2013.01)
*H04L 29/06* (2006.01)
*H04W 72/04* (2009.01)

(58) Field of Classification Search
CPC ... H04W 88/08; H04W 88/005; H04W 88/02; H04W 76/021; H04W 76/02; H04W 76/022; H04W 4/20; H04W 4/005; H04W 80/00; H04W 80/02; H04W 8/26; H04W 8/02; H04W 74/002; H04W 74/0833; H04W 52/02; H04W 68/02; H04L 5/0007; H04L 69/167; H04L 69/16; H04L 69/321; H04L 29/06095; H04L 29/06068; H04L 67/26; H04L 45/026
USPC ............... 370/329, 328, 311; 455/450, 509
See application file for complete search history.

(56) References Cited

U.S. PATENT DOCUMENTS

| | | | | |
|---|---|---|---|---|
| 2003/0185368 | A1* | 10/2003 | Bradfield | H04L 67/16 379/201.03 |
| 2007/0207727 | A1* | 9/2007 | Song | H04H 20/93 455/3.06 |
| 2009/0285096 | A1* | 11/2009 | Yousef | H04L 1/0052 370/235 |
| 2010/0125661 | A1* | 5/2010 | Perala | H04L 43/0852 709/224 |
| 2011/0051617 | A1* | 3/2011 | Nakayama | H04B 7/0443 370/252 |
| 2011/0182220 | A1* | 7/2011 | Black | H04L 67/26 370/311 |
| 2011/0300889 | A1* | 12/2011 | Lee | H04W 28/06 455/509 |
| 2012/0093086 | A1* | 4/2012 | Yin | H04L 69/16 370/328 |
| 2012/0163362 | A1* | 6/2012 | Noh | H04W 28/06 370/338 |
| 2012/0208545 | A1* | 8/2012 | Yang | H04W 74/002 455/450 |
| 2012/0281566 | A1* | 11/2012 | Pelletier | H04W 76/27 370/252 |
| 2012/0282956 | A1* | 11/2012 | Kim | H04L 51/38 455/466 |
| 2015/0009826 | A1* | 1/2015 | Ma | H04W 28/0268 370/235 |
| 2015/0071169 | A1 | 3/2015 | Wang | |
| 2015/0146531 | A1* | 5/2015 | Welin | H04L 47/36 370/235 |

FOREIGN PATENT DOCUMENTS

| | | |
|---|---|---|
| CN | 102316521 A | 1/2012 |
| KR | 10-2011-0093582 A | 8/2011 |
| WO | 2011/119680 A2 | 9/2011 |

\* cited by examiner

METHOD AND DEVICE FOR DETECTING SMALL DATA FROM MOBILE COMMUNICATION SYSTEM

TECHNICAL FIELD

The present invention relates to a mobile communication system. More particularly, the present invention relates to a method and device that identify characteristics of data to be sent by a user equipment and send small-sized data via a control message.

BACKGROUND ART

In general, mobile communication systems have been developed to provide communication services while guaranteeing user mobility. Thanks to rapid technological advancement, mobile communication systems are capable of providing not only voice communication services but also high-speed data communication services.

With recent introduction of various packet services, small-sized packets are sporadically and frequently generated. In a general mobile communication system like LTE, to transmit even a small packet, it is required to establish a connection and configure a data bearer through control messages.

This may require exchange of many control messages. When many user equipments wishing to transmit and receive a small amount of data perform the connection establishment procedure, serious network load may be caused. Moreover, exchange of many control messages may degrade battery performance in user equipments.

Currently, IP data generated by a user equipment is treated uniformly and transmitted through a wireless network regardless of data characteristics. For example, the user equipment uses the same scheme to transmit a keep alive message with a size of 300 bytes or to transmit video data with a size of 100 Mbytes.

For example, in the case of the LTE network, when IP data is generated in a user equipment in idle mode, the user equipment receives allocation of radio and network resources to transition to connected mode for IP data transmission. That is, the user equipment performs RRC establishment, sends a Service Request message to the network for bearer activation, and performs bearer activation for data transmission. When no data is present for a preset time after data transmission, the user equipment transitions back to idle mode.

As described above, the user equipment has to perform mode transition for data transmission and the network has to allocate radio and network resources correspondingly. However, it will be more efficient to transmit small-sized data, which allows low-rate and delay-tolerant transmission such as a keep alive message with a size of 300 bytes, through a scheme reducing overhead due to control messages in comparison to an existing scheme.

For example, it is possible to transmit small-sized data such as a keep alive message by use of an RRC control message transmitted during RRC establishment or a NAS control message transmitted after RRC establishment. In this case, the network may save resources by skipping bearer setup for data transmission and reduce overhead due to control messages.

As a scheme for identifying data characteristics, the screen state of a user equipment may be used to determine whether data is to be transmitted in the background. That is, only data being sent while the screen is off may be regarded as background data. However, this scheme may fail to consider that file transfer or the like can be performed while the screen is off.

Hence, for efficient data transmission, it is necessary to develop a scheme to accurately identify characteristics of data to be sent by a user equipment.

DISCLOSURE OF INVENTION

Technical Problem

The present invention has been made in view of the above problems. Accordingly, an aspect of the present invention is to provide a method and device that examine characteristics of IP data to be sent by a user equipment and, if the IP data is small-sized data, send the IP data via a control message.

Other aspects of the present invention will become apparent to those skilled in the art from the following detailed description, which, taken in conjunction with the annexed drawings, discloses various embodiments of the present invention.

Solution to Problem

In accordance with an aspect of the present invention, a data transmission method for a user equipment is provided. The method may include: generating IP data; determining whether the IP data corresponds to small data that has a size less than or equal to a preset reference size or matches identification information of a preset service; and transmitting the IP data through or not through a connection management (CM) layer to the network by use of a control message.

In a first embodiment, determining whether the IP data corresponds to small data may be performed using a small data packet filter. To this end, the small data packet filter may utilize at least one of an indication to whether the IP data is UDP data or TCP data, the size of the IP data, the address of a server configured to receive the IP data, the port number of the server, the type of a service requiring IP data, and the identifier of the service.

In a second embodiment, determining whether the IP data corresponds to small data may include: checking whether user interaction is present in relation to the IP data; and determining that the IP data is small data when user interaction is not present in relation to the IP data.

In accordance with another aspect of the present invention, a user equipment is provided. The user equipment may include: a transceiver unit to send and receive signals to and from a base station; and a control unit to control a process of generating IP data, determining whether the IP data corresponds to small data that has a size less than or equal to a preset reference size or matches identification information of a preset service, and transmitting the IP data to the network by use of a control message.

Advantageous Effects of Invention

In a feature of the present invention, it is possible to efficiently detect and transmit sporadically generated small-sized IP data.

In addition, the user equipment may identify characteristics of data to be sent and send the data by use of an efficient scheme conforming to the data characteristics, leading to reduction of network resource consumption.

Other features of the present invention will become apparent to those skilled in the art from the following

MODE FOR THE INVENTION

Figure 1:
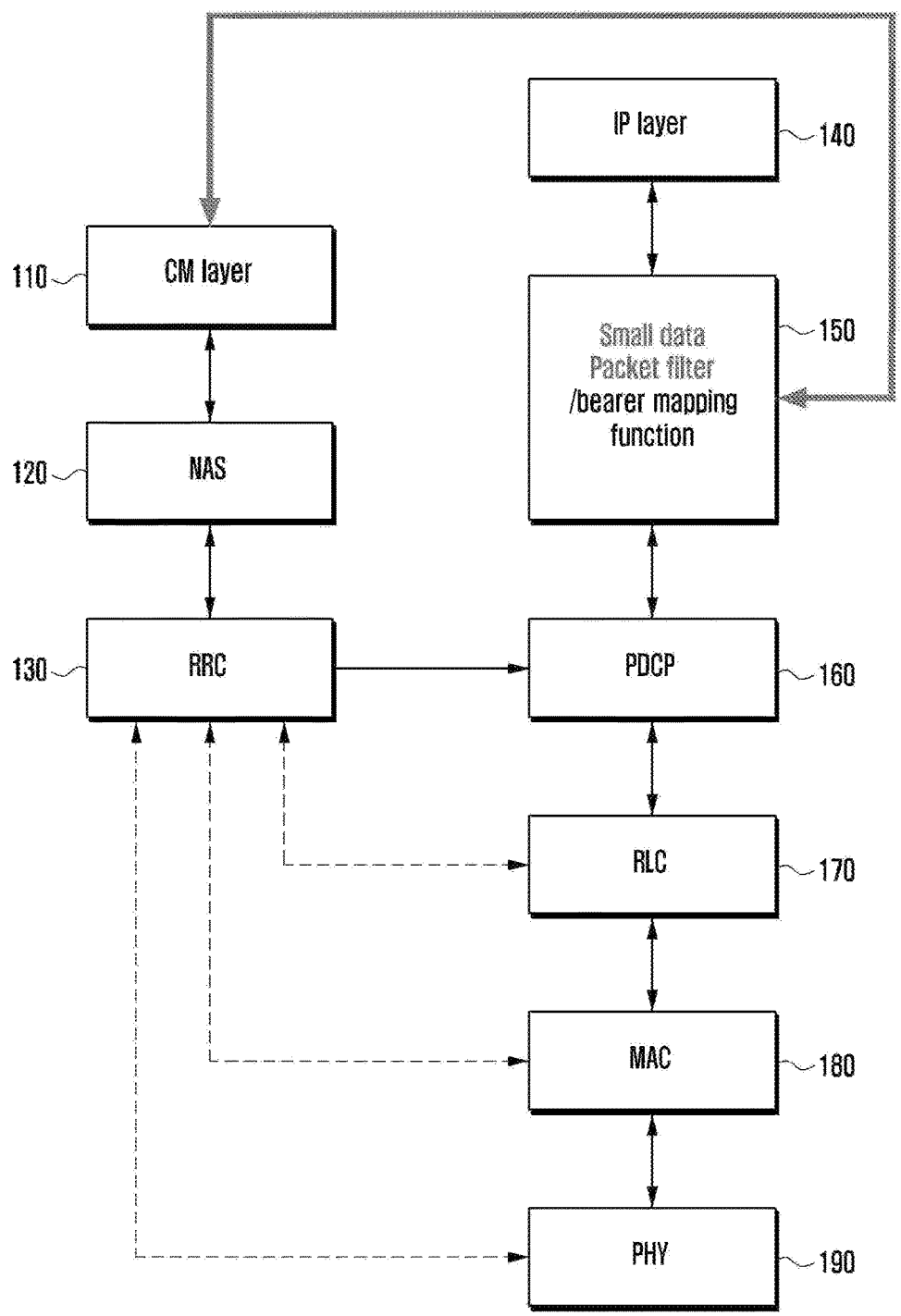
FIG. 1 illustrates a protocol that is configured to send small data via a control message using a small data packet filter installed in a user equipment.

In the description, "small data" refers to small-sized data that allows low-rate and delay-tolerant transmission, such as a keep alive message or a user state change message in instant messaging. A terminal may be referred to as a user equipment (UE).

Hereinafter, exemplary embodiments of the present invention are described in detail with reference to the accompanying drawings. Detailed descriptions of well-known functions and structures incorporated herein may be omitted to avoid obscuring the subject matter of the present invention. Particular terms may be defined to describe the invention. Hence, terms or words used in the description should be construed in accordance with the spirit of the present invention without limiting the subject matter thereof.

The description of the present invention is focused on the Evolved Packet System (EPS). However, it should be understood by those skilled in the art that the subject matter of the present invention or variations thereof is applicable to other communication systems having similar technical backgrounds.

The present invention relates to a scheme to detect characteristics of IP data. For illustration purposes, the scheme is primarily used to identify small-sized data that allows low-rate and delay-tolerant transmission. In addition, the present invention is described on the basis of the Evolved Packet System (EPS).

<First Embodiment> Detecting Small Data Using Packet Filter

In the first embodiment of the present invention, the user equipment may use a packet filter to detect data having desired characteristics. The packet filter may include elements exhibiting characteristics of data to be detected.

In the EPS, one or more packet filters constituting a Traffic Flow Template (TFT) may be installed in the UE and PGW. The TFT may be installed for each PDN connection, and may be created or modified by the PGW or UE and notified to the UE or PGW through NAS messages transmitted during Attach, Session Creation, Session Modification, TAU, or Service Request. A packet filter is described by an IP 5-tuple below.

TABLE 1

Packet Filter Pattern source IP address or IPv6 network prefix; destination IP address or IPv6 network prefix; source port number; destination port number; protocol ID of the protocol above IP;

Table 1 illustrates a packet filter pattern according to one embodiment. Here, source IP address or IPv6 network prefix indicates the IP address of the sender UE, and source port number indicates the port number of the sender UE. Destination IP address or IPv6 network prefix and destination port number indicate the IP address and port number of the receiver UE, respectively. Protocol ID of the protocol above IP indicates the version of IP in use. Such a packet filter may map IP data to a specific PDN bearer in the uplink or downlink direction.

For example, in the case of uplink, assume that a packet filter with (111.111.111.111, 79, 222.2122.222.222, 80, IPv4) is installed in the UE and IP data passing through the packet filter is mapped with the default bearer of an Internet PDN. Then, the source IP address of IP data to be sent by the UE is 111.111.111.111; the source port number of the application in use is 79; the destination server address is 222.222.222.222; the destination port number is 80; and the IP data is sent to the default bearer of the Internet PDN.

In one embodiment of the present invention, to detect small data, a small data packet filter may be installed in the UE. Such a small data packet filter may be the highest precedence packet filter through which IP data destined for the corresponding PDN should pass. Here, IP data matching parameters of the small data packet filter may be classified as small data associated with the specified PDN connection. In the present invention, a small data packet filter may be specified as an extension of the existing packet filter pattern as described below.

TABLE 2

Small Data Packet Filter Pattern

UDP/TCP indication; PDU size; Server IP address; Type of service; Service identity; Server URL;

Table 2 illustrates a small data packet filter pattern according to an embodiment. Here, UDP/TCP indication is an indication to whether IP data to be sent is UDP data or TCP data. When IP data to be sent is UDP data, it may be effective to send the IP data via a control message because UDP data is less frequently exchanged between the UE and server in comparison with TCP data. Alternatively, when information on the number of packets exchanged between the UE and server is provided by the network operator or application, whether to send IP data via a control message may be determined on the basis of the provided information.

PDU size indicates the size of IP data to be sent. IP data with a size less than or equal to a threshold value preset by the network operator may be detected.

Server IP address indicates the address of a server providing a service requiring small data. Such a server may be on the operator network or outside the operator network. For example, the address of a messenger server, associated with Google talk, receiving a keep alive message may be used as server IP address. In some cases, server URL may be utilized. Here, server URL indicates the URL of a server providing a service requiring small data.

Type of service indicates a Differentiated Services Code Point (DSCP) value or an extension thereof. DSCP values may indicate different levels or types of service.

Service identity is a service identifier determined by the network operator or used by network operators. For example, service identity "messenger" may be included in IP data associated with an application such as Google talk. Service identity may be included in the IPv6 extension header.

The above parameters may be updated through an EPS procedure involving TFT update, or may be updated by the network operator through over-the-air update based on OMA-DM. A small data packet filter may be specified by adding some or all of the above parameters to the IP 5-tuple, or by using elements selected from the above parameters and entries of the IP 5-tuple.

A small data packet filter may be installed and managed for one PDN connection, and parameters thereof may differ from PDN connection to PDN connection. A small data packet filter may be not installed for a specific PDN connection. For example, assume that the UE has connections with an Internet PDN and IMS PDN. The network operator may install a small data packet filter at the Internet PDN connection, so that small data like a keep alive message can be sent to the Internet PDN via a control message. On the contrary, the network operator may not install a small data packet filter at the IMS PDN connection used for VoLTE, so that even small data can be transmitted via a data bearer.

A small data packet filter may also be applied to every PDN connection.

FIG. 1 illustrates an internal configuration of a user equipment capable of sending small data via a control message using an installed small data packet filter according to the first embodiment.

The internal configuration of the UE may include Connection management (CM) layer 110, Non-Access Stratum (NAS) 120, Radio Resource Control (RRC) 130, IP layer 140, small data packet filter/bearer mapping function 150, Packet Data Convergence Protocol (PDCP) 160, Radio Link Control (RLC) 170, Medium Access Control (MAC) 180, and Physical Layer (PHY) 190.

In FIG. 1, only entities related to the present invention are described. The CM layer 110 manages functions related to network connections of the UE.

The SMS service may be an example of a service using the CM layer 110. An SMS message sent to the CM layer 110 may be sent to the network via a control message. In the present invention, the CM layer 110 communicates with the NAS 120 to transmit control messages. The connection management function may reside at any site in the UE, such as the operating system, modem and application. Although different names may be used to refer to connection management entities, when the connection management entities provide the same functionality as the CM layer 110, they may be considered as corresponding to an embodiment of the present invention.

The NAS 120 manages modes of the UE and manages control messages between the UE and MME. These control messages are referred to as NAS messages, and may be used for the attach procedure, location information registration, and network resource allocation and management.

The RRC 130 manages control messages between the UE and base station. These control messages are referred to as RRC messages, and may be used for radio resource allocation and management.

The IP layer 140 manages IP data generated at the application layer. The IP layer 140 may reside at the same level as the application layer.

The bearer mapping function 150 determines the bearer that is to be used to transmit generated IP data to the network. IP data generated by the IP layer 140 may be mapped to a specific bearer by the bearer mapping function 150 and delivered to the network through the PDCP 160, RLC 170, MAC 180 and PHY 190.

The small data packet filter may be co-located with the bearer mapping function 150 between the IP layer 140 and PDCP 160. The small data packet filter may reside at a site separate from the bearer mapping function 150. The small data packet filter may also reside at any layer below the IP layer 140 or at any entity of the UE.

In one embodiment, IP data generated at the IP layer 140 passes through the small data packet filter. If the IP data matches parameters of the small data packet filter, it may be redirected to the CM layer 110. Here, information on the PDN connection mapped with the IP data may also be delivered. An APN may be an example of such information.

The small data packet filter may determine whether IP data is to be sent via a control message or via a data bearer. Namely, IP data that is sent through the CM layer 110 to the NAS 120 may be transmitted via a control message.

Figure 2:
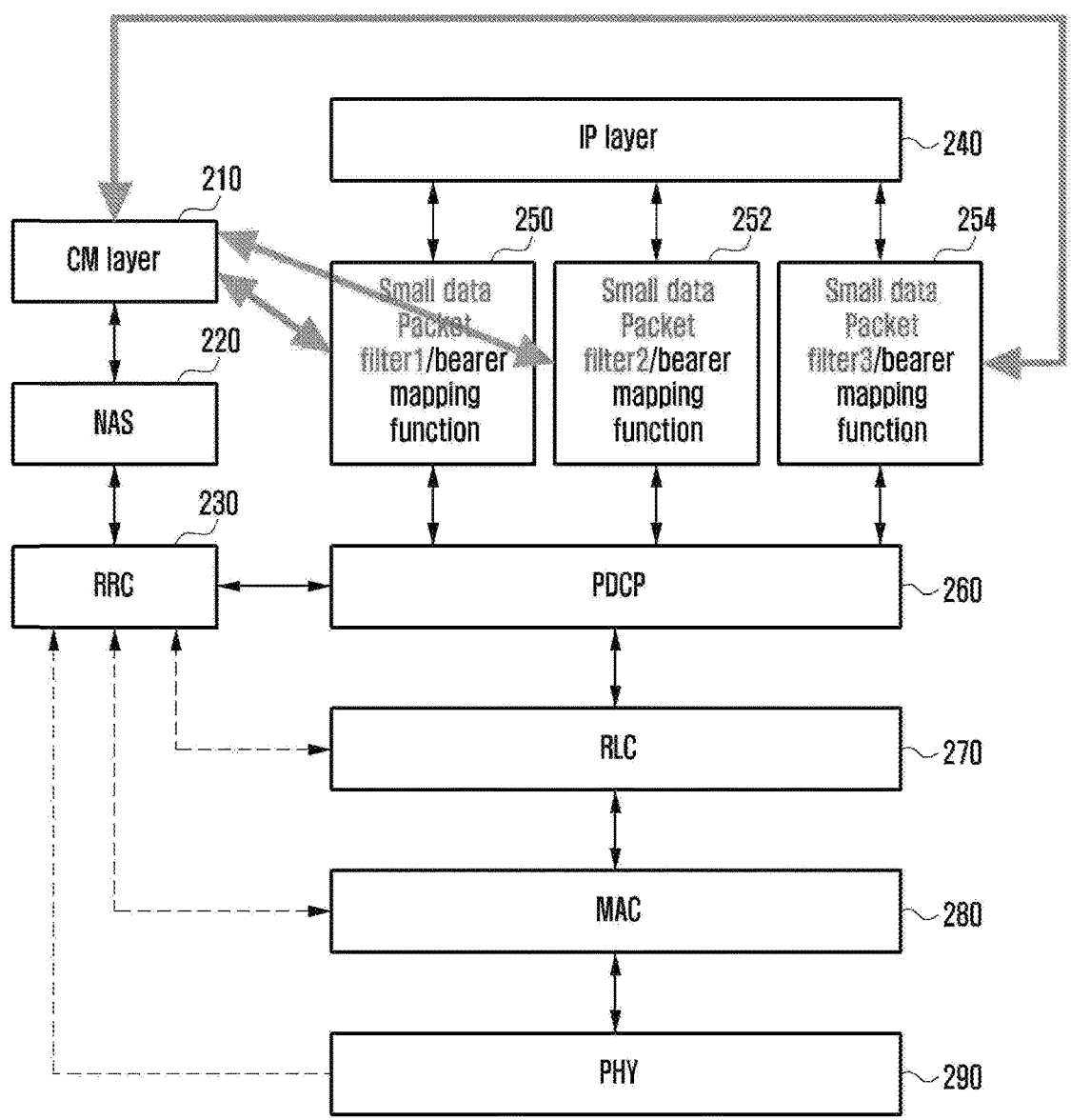
FIG. 2 depicts a situation where the user equipment has multiple PDN connections.

FIG. 2 illustrates an internal configuration of a user equipment capable of sending small data via a control message using installed small data packet filters when the user equipment has multiple PDN connections.

In FIG. 2, the UE has three PDN connections, which are associated respectively with small data packet filters 250, 252 and 254. IP data generated at the IP layer 240 is forwarded to the corresponding PDN connection. If the IP data matches parameters of the small data packet filter 250, 252 or 254 associated with the corresponding PDN connection, it may be redirected to the CM layer 210. Here, as described before, information on the PDN connection mapped with the IP data may also be delivered.

Operations of other entities of FIG. 2 may be identical to those of the corresponding entities of FIG. 1.

Figure 3:
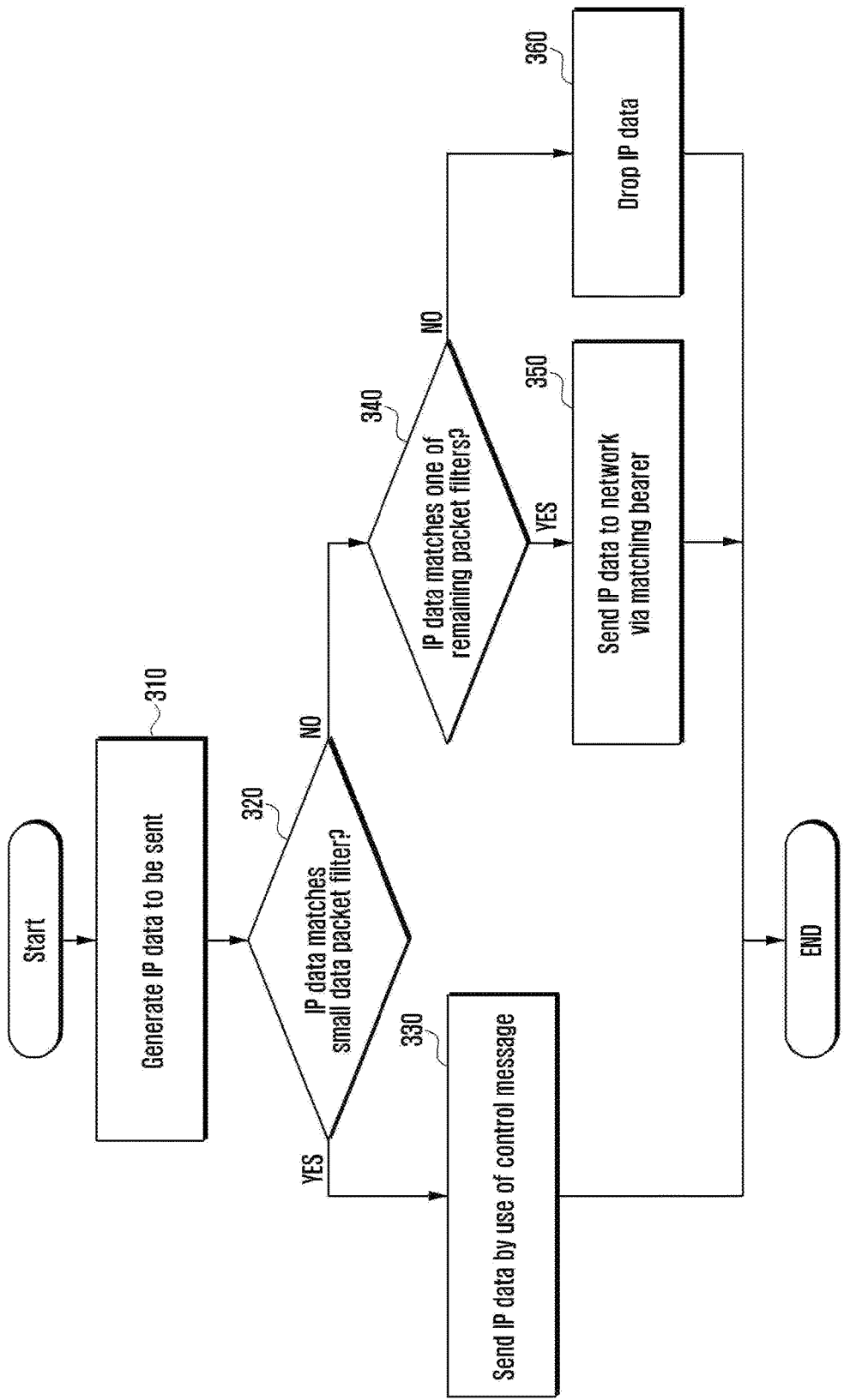
FIG. 3 is a flowchart of a procedure whereby the user equipment identifies generated IP data as small data and sends the same to the network.

FIG. 3 is a flowchart of a procedure whereby the user equipment identifies generated IP data as small data and sends the same to the network according to an embodiment of the present invention.

Referring to FIG. 3, at step 310, IP data to be sent is generated in the UE. IP data may be generated by user input or as a result of data transmission and reception.

At step 320, the UE checks whether the IP data matches the filtering criterion of the small data packet filter described in Table 2. The filtering criterion may be set by the user, application or network operator in advance. The filtering criterion may be set according to a threshold value related with the size of IP data. The threshold value may be varied according to states of the communication system. It may be evident that the filtering criterion can be set according to other information elements in addition to the threshold value.

If the IP data matches the filtering criterion of the small data packet filter, at step 330, the UE sends the IP data to the network via a control message.

If the IP data does not match the filtering criterion of the small data packet filter, at step 340, the UE checks whether the IP data matches the filtering criterion of a low-precedence packet filter. That is, other packet filters excluding the small data packet filter may be applied.

If the IP data matches the filtering criterion of a low-precedence packet filter, at step 350, the UE sends the IP data to the network via a bearer mapped with the matching low-precedence packet filter. If the IP data does not match the filtering criterion of any low-precedence packet filter, at step 360, the UE may drop the IP data.

According to the number of packet filters, step 340 for filtering criterion checking may be repeated. When the default bearer is used to transmit all IP data except for small data, a packet filter passing all IP data should be installed together with the small data packet filter. The packet filter passing all IP data may be referred to as a match-all filter.

The present embodiment is applicable regardless of whether the UE is in idle mode or in connected mode. To apply the present embodiment only when the UE is in idle mode, the following scheme may be used.

When small data detected by the small data packet filter is redirected to the CM layer, the CM layer sends a query for UE mode to the NAS before transmission of the small data. If UE mode is idle mode, the CM layer forwards the small data to the NAS. If UE mode is connected mode, the CM layer redirects the small data to the bearer mapping function. Thereafter, the small data is sent via the mapped bearer.

Alternatively, UE mode may be examined before application of the small data packet filter. UE mode examination may be performed using a mode checking API placed between the IP layer and CM layer.

<Second Embodiment> Using Presence of User Interaction

The second embodiment of the present invention relates to a scheme that detects data having desired characteristics according to presence of user interaction.

Data to be sent by the UE can be generated by user interaction as in the case of a video file and photograph, or be automatically generated by an application for connection management or state update without user interaction as in the case of a keep alive message.

In the second embodiment of the present invention, when data to be sent by the UE is generated without user interaction, the data may be treated as small data.

Figure 4:
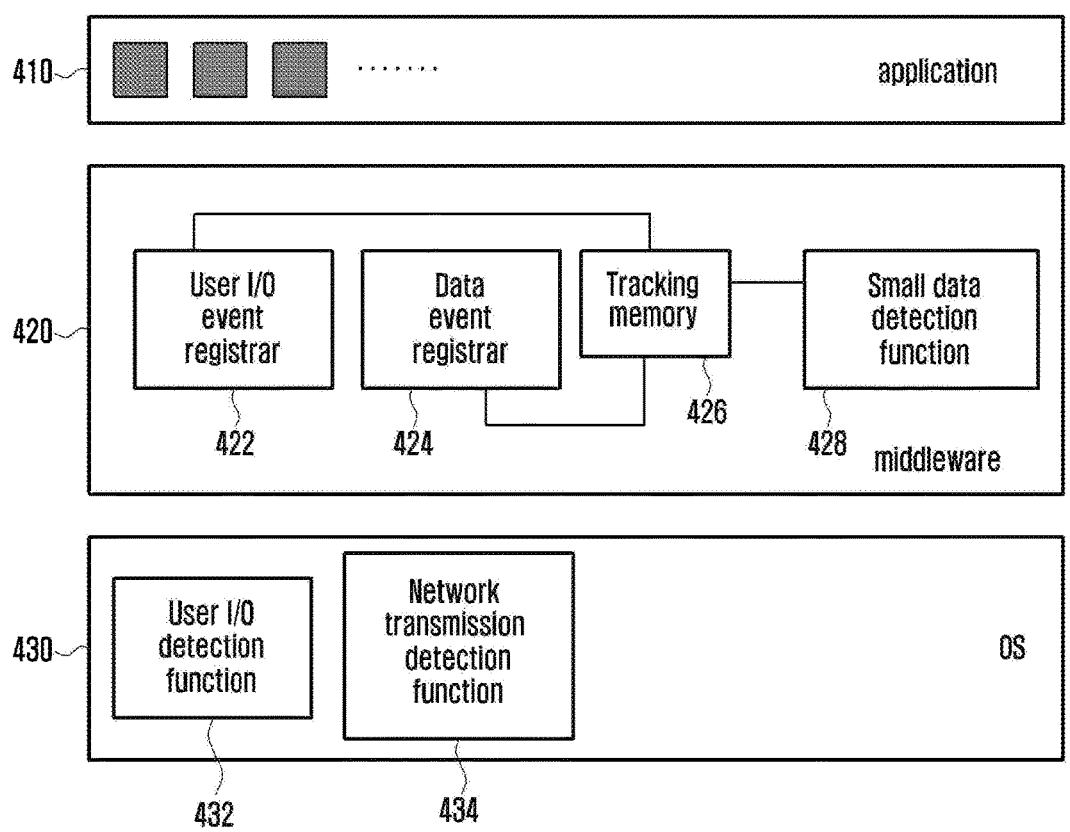
FIG. 4 illustrates layers for detecting small data based on user interaction in the user equipment.

FIG. 4 illustrates an internal configuration of a user equipment capable of detecting small data on the basis of presence of user interaction according to the second embodiment. In addition to the functions and layers shown in FIG. 4, other functions and layers may be included.

The UE capable of detecting small data may include applications 410, middleware 420, and an operating system (OS) 430.

The applications 410 may generate IP data.

The middleware 420 resides between the applications 410 and the OS 420 and serves as an intermediary between the applications 410 and the OS 420. In particular, the middleware 420 may include a user I/O event registrar 422, a data event registrar 424, a tracking memory 426, and a small data detection function 428.

The user I/O event registrar 422 may detect user input entered through the input unit of the UE such as a keypad, touchscreen, or microphone. The user I/O event registrar 422 may record information regarding presence of a user input and generated data in direct or indirect relation to the user input in the tracking memory 426.

The user I/O event registrar 422 may register a specific event at the OS 430 as a request for notification, for example, when the event is generated by the input unit. Later, when a registered event is generated, the OS 430 may notify the user I/O event registrar 422 of this.

The data event registrar 424 may detect generation of data to be sent to the network, and may record information regarding generation of data and generated data in the tracking memory 426. The data event registrar 424 may register a specific event at the OS 430 as a request for notification, for example, when the event is generated by use of a network modem. Later, when a registered event is generated, the OS 430 may notify the data event registrar 424 of this.

The tracking memory 426 is a memory space shared by the user I/O event registrar 422 and the data event registrar 424, and is used to store information regarding a notification issued by the OS 430 in response to generation of an event registered by the user I/O event registrar 422 or data event registrar 424, and data transmitted or received in association with the notification.

The small data detection function 428 may determine whether generated data is small data on the basis of contents recorded in the tracking memory 426.

For example, the small data detection function 428 may compare the time value recorded by the user I/O event registrar 422 with the time value recorded by the data event registrar 424, and determine that the data detected by the data event registrar 424 is generated from user interaction when the difference between the two time values is within a preset threshold. In this case, the generated data may be not classified as small data. When the difference between the two time values is not within the threshold, the small data detection function 428 may determine that user interaction is not present and classify the generated data as small data.

Here, the threshold may be set by the network operator and may be a fixed or variable value in the UE.

The OS 430 is the operating system of the UE. In particular, the OS 430 may include a user I/O detection function 432 and a network transmission detection function 434.

The user I/O detection function 432 detects presence of user input through the input unit of the UE such as a keypad, touchscreen or microphone. Upon occurrence of an event registered by the user I/O event registrar 422, the user I/O detection function 432 notifies the user I/O event registrar 422 of occurrence of the event.

The network transmission detection function 434 detects generation of data to be sent to the network in the UE. Upon generation of an event registered by the data event registrar 424, the network transmission detection function 434 notifies the data event registrar 424 of generation of the event. The user I/O detection function 432 or the network transmission detection function 434 may invoke a specific API of the OS 430 to determine generation of a specific event.

Figure 5:
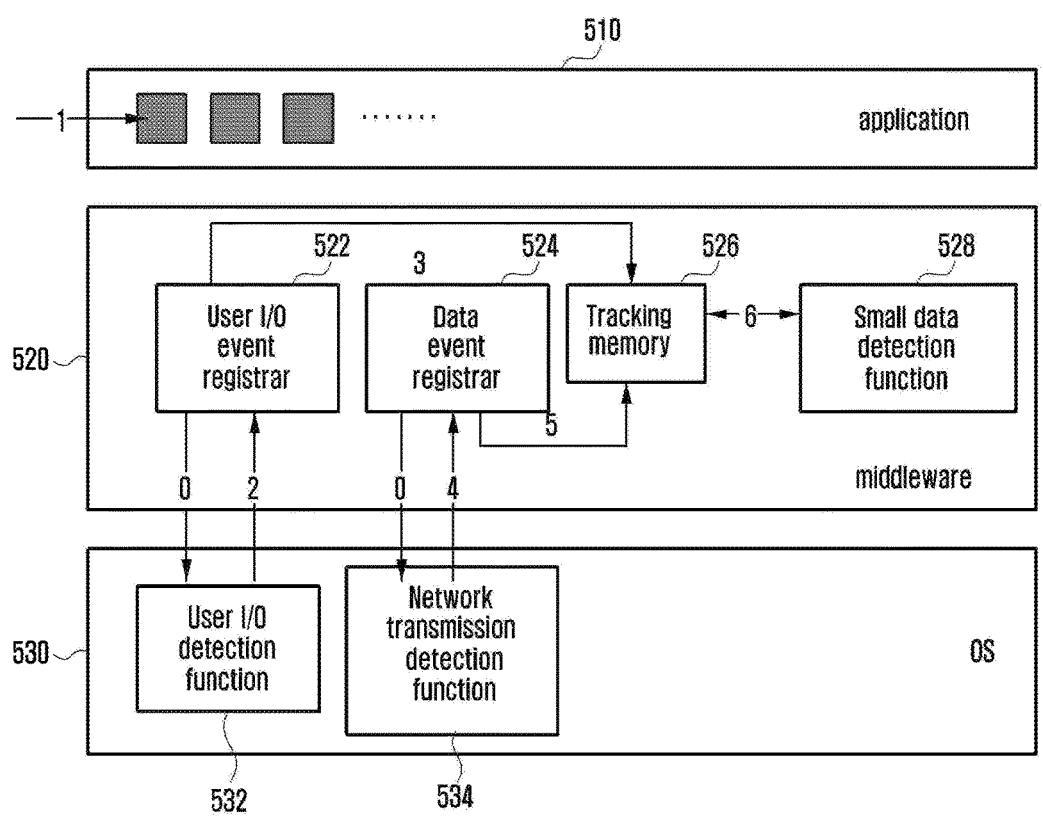
FIG. 5 depicts a procedure for determining whether generated data is small data.

FIG. 5 depicts a procedure whereby the small data detection function determines whether generated data is small data according to the second embodiment of the present invention.

Operations of the entities of FIG. 5 may be identical to those of the corresponding entities with identical names in FIG. 4.

As shown in FIG. 5, firstly, at step 0, the user I/O event registrar 522 and the data event registrar 524 register events to be notified at the user I/O detection function 532 and the network transmission detection function 534, respectively.

Thereafter, at step 1, the user may start a desired application. The application may generate data during execution.

At step 2, the user I/O detection function 532 detects user input through the input unit and notifies this to the user I/O event registrar 522.

At step 3, the user I/O event registrar 522 records information, including the time value at which the event notified at step 2 has occurred, in the tracking memory 526. In addition, event type information may be recorded. The event type information may indicate generation of a particular event and data to be transmitted or received in response to the event.

At step 4, the network transmission detection function 534 detects generation of data to be sent to the network in the UE and notifies this to the data event registrar 524.

At step 5, the data event registrar 525 records information, including the time value at which the event notified at step 4 has occurred, in the tracking memory 526. In addition, event type information may be recorded. The event type information may indicate generation of a particular event and data to be transmitted or received in response to the event.

At step 6, the small data detection function 528 compares the time value recorded at step 3 with the time value recorded at step 5 and classifies the generated data as small data when the difference between the two time values is within a preset threshold. Thereafter, the data classified as small data may be processed in the same manner described before.

Figure 6:
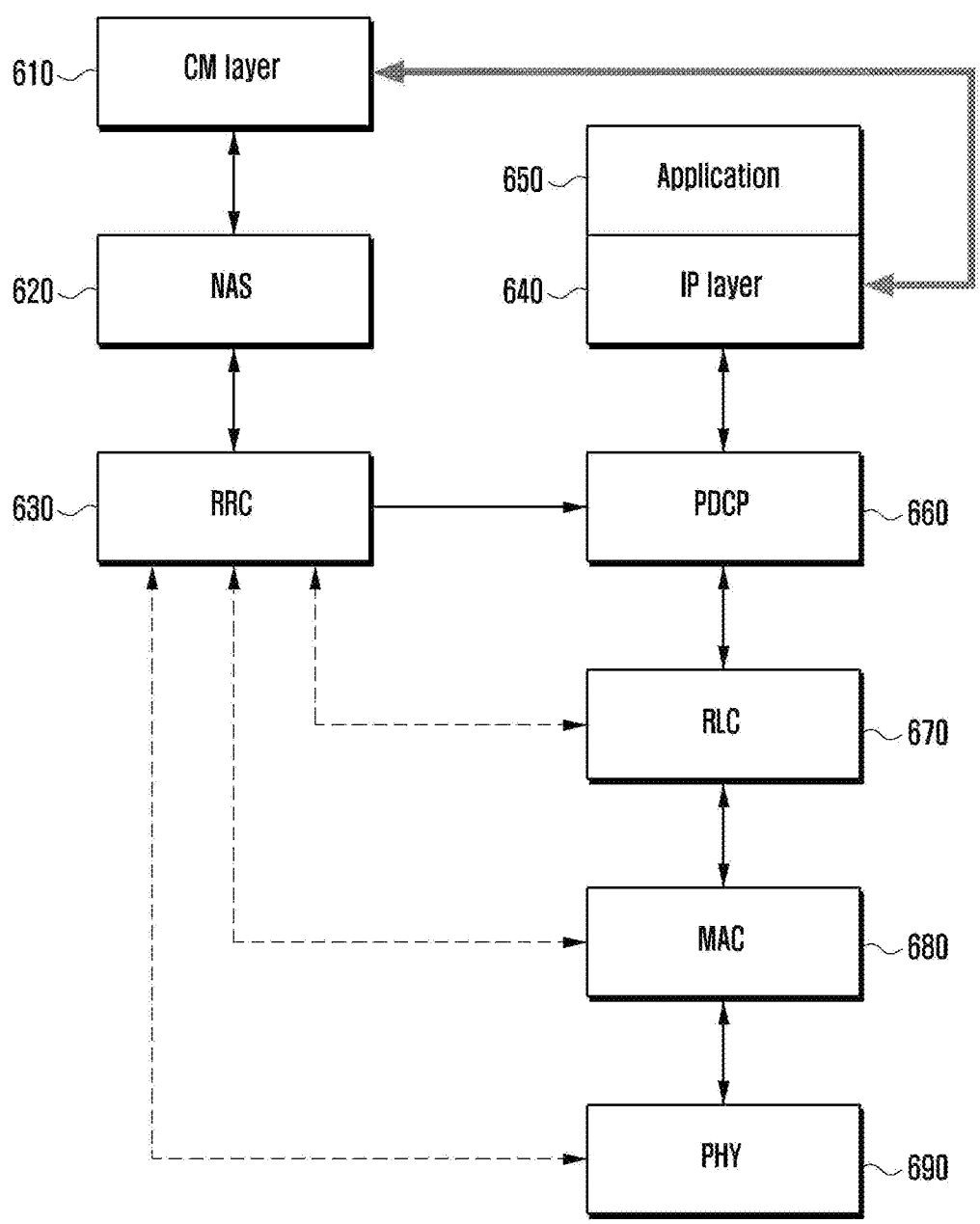
FIG. 6 depicts a procedure for sending small data via a control message by use of a small data detection function configured in the user equipment.

FIG. 6 illustrates an internal configuration of a user equipment capable of sending small data via a control message using a small data detection function according to the second embodiment.

Referring to FIG. 6, IP data generated at the application 650 or the IP layer 640 may be redirected to the CM layer 610 when it matches the criterion of the small data detection function. That is, the IP data is forwarded by the CM layer 610 to the NAS 620, which may send the IP data via a control message. Operations of other entities of FIG. 6 may be identical to those of the corresponding entities of FIG. 1 or FIG. 2.

In the first embodiment and second embodiment of the present invention, small data is described as being redirected to the CM layer. However, small data may be redirected to the NAS or the RRC. In this case, to identify UE mode, the layer or function having the small data packet filter may be associated with the NAS or the RRC.

In one embodiment, the user equipment may include a transceiver unit to send and receive signals to and from a base station, and a control unit to control the transceiver unit to send and receive data and to process or examine data according to preconfigured settings. In addition, the control unit may control a process of generating IP data, determining whether the IP data is small data matching a preset criterion, and sending the IP data through the connection management layer to the network by use of a control message.

The network may be any entity on the network, such as a base station or MME.

Hereinabove, various embodiments of the present invention have been shown and described for the purpose of illustration without limiting the subject matter of the present invention. It should be understood by those skilled in the art that many variations and modifications of the method and apparatus described herein will still fall within the spirit and scope of the present invention as defined in the appended claims and their equivalents.

The invention claimed is:

1. A method of data transmission by a terminal, the method comprising:
generating first internet protocol (IP) data for a first packet data network (PDN) connection installed with a small data packet filter;
determining whether the first IP data satisfies a preset criterion of the small data packet filter, by determining whether a size of the first IP data is less than or equal to a predetermined size and the first IP data matches identification information of a preset service;
transmitting, in case that the first IP data satisfies the preset criterion of the small data packet filter, the first IP data through a connection management layer to a base station by using a control message;
determining, in case that the first IP does not satisfy the preset criterion of the small data packet filter, whether the first IP data matches at least one other packet filter of a precedence lower than the small data packet filter;
transmitting the first IP data by using a radio bearer, in case that the first IP data matches the at least one other packet filter;
dropping the first IP data in case that the first IP data does not match the at least one other packet filter;
generating a second IP data for a second PDN connection without the small data packet filter; and
transmitting the second IP data to the base station by using a radio bearer.

2. The method of claim 1, wherein the small data packet filter is used to check whether the first IP data satisfies the preset criterion based on at least one of an indication of whether the first IP data is user datagram protocol (UDP) data or transmission control protocol (TCP) data, the size of the first IP data, an address of a server to transmit the first IP data, a port number of the server, a service type of the first IP data provided by the server, and an identifier of the service.

3. The method of claim 1, wherein the transmitting of the first IP data comprises transmitting the first IP data through the connection management layer to the base station by using a non-access stratum (NAS) control message.

4. The method of claim 1, wherein the determining comprises:
determining whether a user interaction is present in relation to the first IP data; and
determining that the first IP data is a small data when the user interaction is not present in relation to the first IP data.

5. The method of claim 4, wherein the determining of whether the user interaction is present comprises determining that the user interaction is not present in relation to the first IP data, when a difference between an occurrence time of a user input or output and a generation time of the first IP data is greater than or equal to a preset time value.

6. The method of claim 4, further comprising:
transmitting, in case that the first IP data matches one of one or more packet filters whose filtering criteria are different from the preset criterion, the first IP data by using a bearer mapped with the matching packet filter.

7. The method of claim 4, further comprising:
dropping the first IP data in case that the first IP data does not match any of packet filters whose filtering criteria are different from the preset criterion.

8. The method of claim 1, wherein the first PDN connection is a PDN connection for an internet service, and the second PDN connection is a PDN connection for an IMS service.

9. A terminal supporting data transmission, comprising:
a transceiver configured to transmit and receive signals to and from a base station; and
a controller configured to:

generate first internet protocol (IP) data for a first packet data network (PDN) connection installed with a small data packet filter, determine whether the first IP data satisfies a preset criterion of the small data packet filter, by determining whether a size of the first IP data is less than or equal to a predetermined size and the first IP data matches identification information of a preset service, control the transceiver to transmit, in case that the first IP data satisfies the preset criterion of the small data packet filter, the first IP data through a connection management layer to the base station by using a control message, determine, in case that the first IP does not satisfy the preset criterion of the small data packet filter, whether the first IP data matches at least one other packet filter of a precedence lower than the small data packet filter, transmit the first IP data by using a radio bearer, in case that the first IP data matches the at least one other packet filter, drop the first IP data in case that the first IP data does not match the at least one other packet filter, generate a second IP data for a second PDN connection without the small data packet filter, and control the transceiver to transmit the second IP data to the base station by using a radio bearer.

10. The terminal of claim 9, wherein the small data packet filter is used to check whether the first IP data satisfies the preset criterion based on at least one of an indication to whether the first IP data is user datagram protocol (UDP) data or transmission control protocol (TCP) data, the size of the first IP data, an address of a server to transmit the first IP data, a port number of the server, a service type of the first IP data provided by the server, and an identifier of the service.

11. The terminal of claim 9, wherein the controller is further configured to control the transceiver to transmit the first IP data through the connection management layer to the base station by using a non-access stratum (NAS) control message.

12. The terminal of claim 9, wherein the controller is further configured to:
determine whether a user interaction is present in relation to the first IP data; and
determine that the first IP data is small data when the user interaction is not present in relation to the first IP data.

13. The terminal of claim 12, wherein the controller is further configured to determine that the user interaction is not present in relation to the first IP data, when a difference between an occurrence time of a user input or output and a generation time of the first IP data is greater than or equal to a preset time value.

14. The terminal of claim 12, wherein, in case that the first IP data matches one of one or more packet filters whose filtering criteria are different from the preset criterion, the controller is further configured to control the transceiver to transmit the first IP data by using a bearer mapped with the matching packet filter.

15. The terminal of claim 12, wherein the controller is further configured to drop the first IP data in case that the first IP data does not match any of packet filters whose filtering criteria are different from the preset criterion.

16. The terminal of claim 9, wherein the first PDN connection is a PDN connection for an internet service, and the second PDN connection is a PDN connection for an IMS service.

* * * * *